US011520703B2

(12) United States Patent
Dias et al.

(10) Patent No.: US 11,520,703 B2
(45) Date of Patent: Dec. 6, 2022

(54) ADAPTIVE LOOK-AHEAD CONFIGURATION FOR PREFETCHING DATA IN INPUT/OUTPUT OPERATIONS

(71) Applicant: EMC IP Holding Company LLC, Hopkinton, MA (US)

(72) Inventors: Jonas F. Dias, Rio de Janeiro (BR); Rômulo Teixeira de Abreu Pinho, Niterói (BR); Diego Salomone Bruno, Nova Friburgo (BR); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,135

(22) Filed: Jan. 31, 2019

(65) Prior Publication Data
US 2020/0250096 A1    Aug. 6, 2020

(51) Int. Cl.
*G06F 12/08*   (2016.01)
*G06F 12/0862*   (2016.01)
(Continued)

(52) U.S. Cl.
CPC ........ *G06F 12/0862* (2013.01); *G06F 3/0611* (2013.01); *G06F 3/0646* (2013.01);
(Continued)

(58) Field of Classification Search
CPC ............. G06F 12/0862; G06F 12/0866; G06F 12/0868; G06F 12/0871; G06F 12/0873;
(Continued)

(56) References Cited

U.S. PATENT DOCUMENTS 6,092,149 A * 7/2000 Hicken ................. G06F 3/0676
 711/112
7,359,890 B1 * 4/2008 Ku ..................... G06F 16/24552
(Continued)

OTHER PUBLICATIONS

Atzori et al., "The Internet of Things: A survey," Computer Networks, 54 (2010) 2787-2805.
(Continued)

*Primary Examiner* — Ilwoo Park
(74) *Attorney, Agent, or Firm* — Ryan, Mason & Lewis, LLP (57) ABSTRACT

Techniques are provided for adaptive look-ahead configuration for data prefetching. One method comprises, in response to a request for a data item in a storage system: obtaining a size of a look-ahead window for the request based on one of multiple available caching policies; and moving the requested data item and additional data items within the look-ahead window to the cache memory when the requested data item and/or the additional data items within the look-ahead window are not in the cache memory. The multiple available caching policies comprise a caching policy based on characteristics of an input/output workload of the storage system, or a portion thereof; and/or a caching policy based on an input/output workload of at least a portion of the storage system within a prior predefined time window. The look-ahead window size may be varied over time.

20 Claims, 9 Drawing Sheets

(51) Int. Cl.
*G06F 12/0815* (2016.01)
*G06N 20/00* (2019.01)
*G06F 3/06* (2006.01)

(52) U.S. Cl.
CPC ........ *G06F 3/0674* (2013.01); *G06F 12/0815* (2013.01); *G06N 20/00* (2019.01)

(58) Field of Classification Search
CPC .... G06F 12/0815; G06F 3/061; G06F 3/0611; G06F 3/0646; G06F 3/0655; G06F 3/0674
USPC .................................................. 711/137, 213
See application file for complete search history.

(56) References Cited

U.S. PATENT DOCUMENTS

| | | | |
|---|---|---|---|
| 8,429,351 B1 | 4/2013 | Yu et al. | |
| 8,667,224 B1 | 3/2014 | Yu et al. | |
| 9,547,459 B1 | 1/2017 | BenHanokh et al. | |
| 10,001,927 B1 | 6/2018 | Trachtman et al. | |
| 2001/0016897 A1 | 8/2001 | Bates et al. | |
| 2002/0042861 A1* | 4/2002 | Kavipurapu | G06F 12/0864 711/118 |
| 2003/0028694 A1 | 2/2003 | Aboulenein | |
| 2005/0203863 A1* | 9/2005 | Idei | G06F 16/2453 |
| 2007/0214325 A1* | 9/2007 | Sasamoto | G06F 12/0862 711/137 |
| 2008/0229027 A1* | 9/2008 | Shioya | G06F 12/0862 711/137 |
| 2008/0229071 A1* | 9/2008 | Shioya | G06F 12/0862 712/207 |
| 2009/0063778 A1* | 3/2009 | Nomura | G06F 12/0862 711/137 |
| 2010/0199036 A1 | 8/2010 | Siewert et al. | |
| 2011/0202717 A1 | 8/2011 | Kezuka et al. | |
| 2012/0185651 A1* | 7/2012 | Kimori | G06F 12/0862 711/137 |
| 2014/0052928 A1* | 2/2014 | Shimoi | G06F 12/0862 711/137 |
| 2015/0074328 A1 | 3/2015 | Baryudin | |
| 2015/0324135 A1 | 11/2015 | Chan et al. | |
| 2016/0098212 A1 | 4/2016 | Tokoyoda et al. | |
| 2016/0154750 A1* | 6/2016 | Park | G06F 3/0671 711/153 |
| 2017/0123988 A1* | 5/2017 | Chun | G06F 12/0862 |
| 2018/0067961 A1 | 3/2018 | Yang et al. | |
| 2020/0092346 A1* | 3/2020 | Choi | H04L 65/608 |

OTHER PUBLICATIONS

Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: http://martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386) IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: https://en.wikipedia.org/wiki/Complex_event_processing.
"Publish-subscribe pattern," Available in: https://en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. Appl. 11, (Dec. 4, 2017), 427-443. DOI: https://doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Communications (GreenCom) and IEEE Cyber, Physical and Social Computing (CPSCom) and IEEE Smart Data (SmartData), Exeter, 2017, pp. 792-799.
Methods and Apparatus for Real-Time Anomaly Detection over Sets of Time Series—Nov. 2017 Dell EMC Confidential pp. 24 of 24
"Hypervisor," Available in: https://en.wikipedia.org/wiki/Hypervisor.
"EdgeX Foundry," Available in: https://www.edgexfoundry.org.
"Orion Context Broker," Available in: https://catalogue.fiware.org/enablers/publishsubscribe-context-broker-orion-context-broker.
"Fiware NGSI Open RESTful API Specification," Available in: http://forge.fiware.org/plugins/mediawiki/wiki/fiware/index.php/FIWARE_NGSI_Open_RESTful_API_Specification. Last accessed: Jun. 28, 2018.
"ZeroMQ," Available in: https://en.wikipedia.org/wiki/ZeroMQ.
D. Merkel, "Docker: Lightweight Linux Containers for Consistent Development and Deployment," Linux Journal, vol. 2, p. 234, (2014).
K. Hornik, "Approximation capabilities of multilayer feedforward networks," Neural networks, vol. 2, No. 4, pp. 251-257, 1991.
Betts, et al., "Estimating the WCET of GPU-accelerated applications using hybrid analysis," Real-Time Systems (ECRTS), 2013.

(56) References Cited

OTHER PUBLICATIONS

U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
U.S. Appl. No. 16/034,432, entitled, "Resource Allocation and Provisioning in a Multi-Tier Edge-Cloud Virtualization Environment", filed Jul. 13, 2018.
U.S. Appl. No. 16/400,289, entitled, "Adaptive Controller for Online Adaptation of Resource Allocation Policies for Iterative Workloads Using Reinforcement Learning", filed May 1, 2019.
U.S. Appl. No. 16/401,604, entitled, "Resource Allocation and Provisioning in a Multi-Tier Edge-Cloud Virtualization Environment", filed May 2, 2019.
U.S. Appl. No. 16/397,596, entitled, "Adaptive Look-Ahead Configuration for Prefetching Data in Input/Output Operations Based on Request Size and Frequency", filed Apr. 29, 2019.
U.S. Appl. No. 16/508,347 entitled, "Real-Time Pre-Fetch Determinaton Based on LUN-specific Sequential Patterns," filed Jul. 11, 2019.
U.S. Appl. No. 16/671,617 entitled, "Sequentiality Characterization of Input/Output Workloads," filed Nov. 1, 2019.
Ester et al., "A density-based algorithm for discovering clusters in large spatial databases with noise," in Proceedings of the Second International Conference on Knowledge Discovery and Data Mining (KDD-96), 1996.
Van Der Maaten et al., "Visualizing Data Using t-SNE," Journal of Machine Learning Research, vol. 9, pp. 2579-2605, 2008.
Cao et al., "ALACC: Accelerating Restore Performance of Data Deduplication Systems Using Adaptive Look-Ahead Window Assisted Chunk Caching", Proceedings of the 16th USENIX Conference on File and Storage Technologies, Oakland, CA (Feb. 12-15, 2018).
https://www.cloudflare.com/learning/cdn/what-is-a-cache-hit-ratio/#:~:text=Cache%20hit%20ratio%20is%20a,a%20high%20cache%20hit%20ratio., downloaded on Apr. 29, 2021.
https://wp-rocket.me/blog/calculate-hit-and-miss-ratios/, downloaded on Apr. 29, 2021.

\* cited by examiner

ADAPTIVE LOOK-AHEAD CONFIGURATION FOR PREFETCHING DATA IN INPUT/OUTPUT OPERATIONS

FIELD

The field relates generally to caching techniques for input/output operations.

BACKGROUND

Prefetching is a known technique for optimizing cache behavior. Prefetching exploits data locality with the assumption that applications often request data residing in sequential addresses in a given address space. Despite the fact that prefetching generally tends to yield good results, the performance is often dependent on a good choice for a size of the look-ahead window, leading to unnecessary cache evictions if the look-ahead window size is not selected properly. The choice of look-ahead window size, in turn, is dependent on how applications that access a given storage device traverse the address space of the storage device when requesting data.

A need exists for adaptive look-ahead techniques for data prefetching that depend on characteristics of the workload of the applications that access the storage system.

SUMMARY

In one embodiment, a method comprises, in response to a request for at least one data item in a storage system that employs a cache memory, performing the following steps: obtaining a size of a look-ahead window for the request based on one of a plurality of available caching policies in the storage system, wherein the plurality of available caching policies comprise two or more of: a first caching policy based on characteristics of an input/output workload of the storage system; a second caching policy based on an input/output workload of a particular portion of the storage system; and a third caching policy based on an input/output workload of at least a portion of the storage system within a prior predefined time window; and moving the requested at least one data item and one or more additional data items within the look-ahead window from the storage system to the cache memory responsive to one or more of the requested at least one data item and the additional data items within the look-ahead window not being in the cache memory.

In some embodiments, the characteristics of the input/output workload of the storage system comprise one or more of sizes of requests, frequencies of the requests, traversal characteristics of the requests across an address space of the storage system, a concentration of read requests and a concentration of write requests. The size of the look-ahead window is optionally varied over time.

In one or more embodiments, the size of the look-ahead window is determined based on one or more predefined caching criteria and the determined look-ahead window size is employed if the predefined caching criteria is satisfied. The predefined caching criteria is evaluated, for example, using a simulation engine that processes training data.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adaptive look-ahead configuration for data prefetching.

As noted above, data prefetching is a known technique for optimizing cache behavior. Prefetching exploits data locality with the assumption that applications often request data residing in sequential addresses in a given address space. Namely, when an operating system of a device receives a data access request at a certain address, $A_i$, the operating system retrieves not only the content of that location, but also the contents of the N next address locations, $\{A_{i+1}, \ldots, A_{i+N}\}$, before the application actually requests the data from those other addresses. The operating system then places the retrieved content in a cache, which is typically a faster storage media than the storage media where the data originally resides. If the application indeed requests data from subsequent addresses, the operating system satisfies those requests directly from the cache, instead of fetching data from the slower storage media for each request. The parameter N defines the number of sequential addresses that the operating system prefetches to the cache at each request, and it is often referred to as the look-ahead window.

Despite the fact that prefetching tends to yield very good results in general, prefetching is dependent on a good choice for the look-ahead window. Such dependency arises from the fact that the cache size is usually much smaller than the actual storage size. As a result, the cache needs to employ a data eviction policy to make space for new data whenever the cache is full. Incorrect look-ahead windows may thus lead to unnecessary data eviction, reducing the overall cache performance.

The choice of the look-ahead window, in turn, is dependent on how the applications that access the device traverse the address space of the storage system when requesting data. One or more aspects of the present disclosure thus recognize that look-ahead windows should be adaptive. However, storage system vendors typically employ a single, fixed cache policy in their products. Although such policies work well on average, they fail to capture the nuances of the access patterns associated with the applications, losing a tremendous opportunity for optimization.

One or more embodiments of the present disclosure address this cache optimization problem by automatically and adaptively choosing different look-ahead windows for each storage system in order to improve cache use and application performance in general.

Advanced enterprise storage systems typically have a single prefetching policy, with one fixed look-ahead window configuration. This is not ideal because several applications, with different data access patterns, may access the storage system concurrently. Each access pattern traverses the address space of the system differently. For instance, some access patterns might be sequential, while other access patterns might be random; some access patterns might traverse the entire address space, while other access patterns might be concentrated in a small range of addresses.

In addition, system administrators often subdivide storage systems into many logically separated storage areas, often referred to as LUNs or thin devices (TDEVs), each with its own addressable space defined in logical block addresses (LBAs). Enterprise-grade applications are configured to leverage the underlying storage configuration, and sometimes even determine how the storage should be configured. Consequently, LUN configurations might even be different for the same application running in different places. For instance, a database administrator (DBA) working at "Bank A" might configure the LUNs for the bank's database management system (DBMS) differently than a DBA working at "Bank B" might configure them for the DBMS of Bank B.

Access patterns also vary with time and often reflect aspects of the seasonality of the operations associated with them. Therefore, in some embodiments, the disclosed techniques for automatic, adaptive prefetching employ adaptive cache policies both in terms of how a storage system is subdivided into LUNs and in terms of how those LUNs are accessed across time.

One or more embodiments of the disclosed automatic, adaptive prefetching techniques comprise up to three independent caching policies, based on adaptive prefetching, each discussed further below:

1. fixed, optimized look-ahead for the entire storage system;
2. fixed, optimized look-ahead for each LUN of the storage system; and
3. variable, optimized look-ahead across time.

The aforementioned caching policies use a simulation engine to seek the substantially optimal value for the look-ahead window by extensively exploring the parameter search space. In an exemplary simulation engine, a fixed-size buffer represents the cache of a particular storage system. Then, the I/O (input/output) requests associated with that system are processed in order of occurrence. For each request, if the LBA reference is already in the cache, the cache hit count is increased. If the LBA reference is not already in the cache, the LBA is brought to the cache and the cache hit count is not increased. The latter situation thus defines a cache miss. With prefetching, the requested address, $A_i$, is retrieved, as well as the N subsequent addresses, $\{A_{i+1}, \ldots, A_{i+N}\}$, if they are not in the cache. When the cache buffer is full, a traditional Least Recently Used (LRU) policy is used in some embodiments to evict data from the cache before filling it up with new address references. In other embodiments, alternate cache deletion policies can be employed, such as a Least Frequently Used policy, a Segmented LRU policy and/or an adaptive replacement policy (e.g., IBM Adaptive Replacement Cache (ARC) policy).

Figure 1:
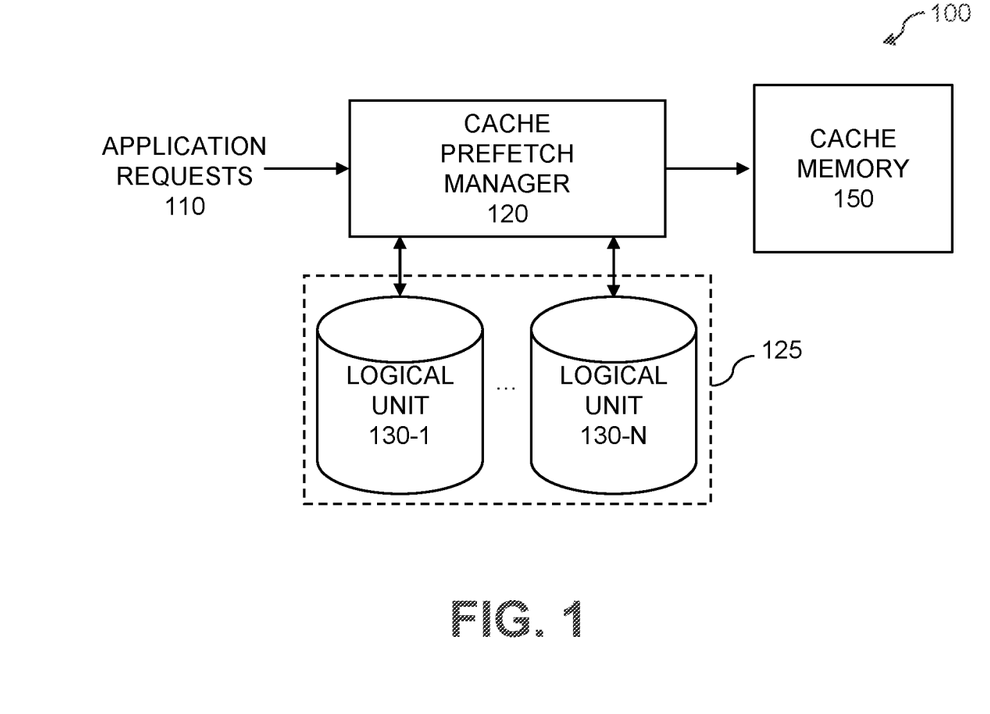
FIG. 1 illustrates an exemplary storage environment, according to one embodiment of the disclosure.

FIG. 1 illustrates an exemplary storage environment 100, according to one embodiment of the disclosure. As shown in FIG. 1, the exemplary storage environment 100 comprises a cache prefetch manager 120 that processes one or more application requests 110 from one or more one or more applications (not shown in FIG. 1). An exemplary storage system 125 comprises one or more logical units 130-1 through 130-N. In further variations, physical storage units can be employed in the exemplary storage environment 100 in addition to, or instead of, the logical units 130 shown in FIG. 1. Likewise, while one or more exemplary embodiments refer to logical addresses, physical addresses can also be employed, as would be apparent to a person of ordinary skill in the art.

For an application request 110 at a certain address, $A_i$, the cache prefetch manager 120 retrieves the content of that location ($A_i$), but also the contents of the N next address locations, $\{A_{i+1}, \ldots, A_{i+N}\}$, before the application actually requests the data from those other addresses, and the cache prefetch manager 120 places the retrieved content in a cache memory 150.

Figure 2:
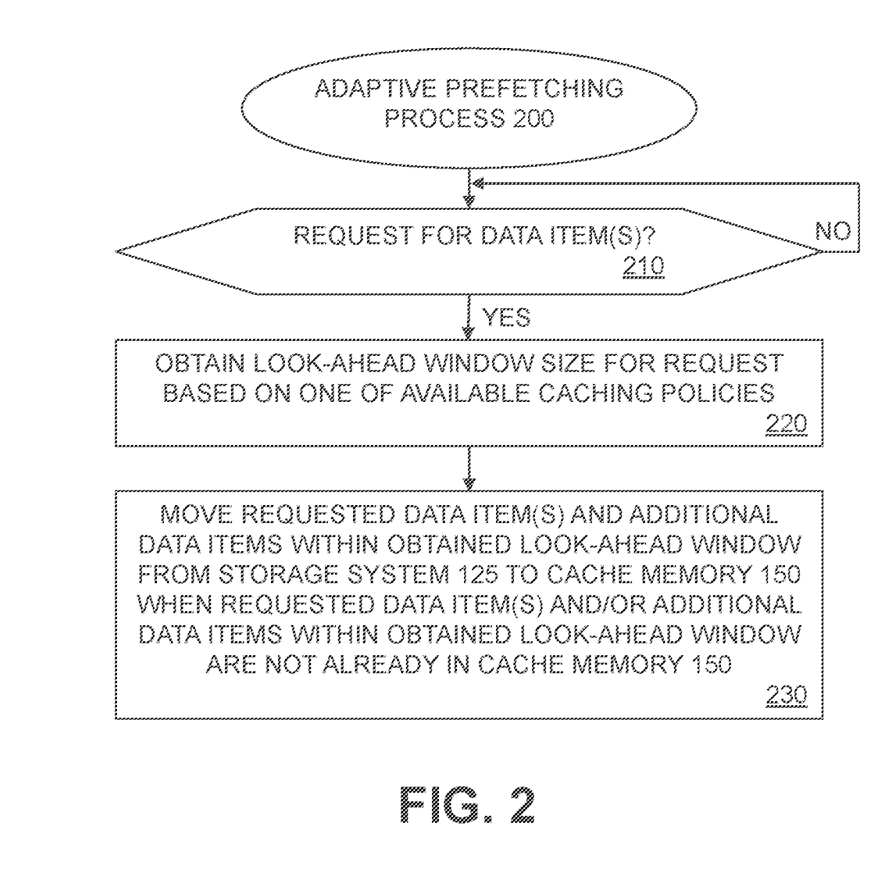
FIG. 2 is a flow chart illustrating an exemplary implementation of an adaptive prefetching process, according to an embodiment.

FIG. 2 is a flow chart illustrating an exemplary implementation of an adaptive prefetching process 200, according to an embodiment of the disclosure. As shown in FIG. 2, a test is performed during step 210 to determine if a request is received for a data item. Once it is determined during step 210 that a request is received for one or more data items, the exemplary adaptive prefetching process 200 obtains a look-ahead window size for the request during step 220 based on one of a number of available caching policies. In one exemplary embodiment the available caching policies comprise a caching policy based on characteristics of an input/output workload of the storage system 125; a caching policy based on an input/output workload of a particular portion of the storage system 125; and/or a caching policy based on an input/output workload of at least a portion of the storage system 125 within a prior predefined time window, as discussed further below in conjunction with FIGS. 3 through 7.

During step 230, the exemplary adaptive prefetching process 200 moves the requested one or more data items as well as additional data items within the obtained look-ahead window from the storage system 125 to the cache memory 150, when the requested one or more data items and/or the additional data items within the obtained look-ahead window are not already in the cache memory 150.

Fixed, Optimized Look-Ahead for Entire Storage System

In at least one embodiment, the exemplary automatic, adaptive prefetching techniques employ a first caching policy that substantially optimizes the look-ahead window for the entire storage system 125. Generally, for the exemplary first caching policy, the cache prefetch manager 120 collects information about the data access patterns for a certain period of time. The cache prefetch manager 120 then substantially optimizes the look-ahead window for the entire storage system 125, and employs the optimized look-ahead value going forward, as discussed hereinafter.

The optimization leverages the characteristics of the workload, using an exemplary simulation engine and I/O telemetry (traces) collected from the storage system 125 processing the workload, referred to herein as training data. The first exemplary caching policy can be implemented in different ways. In one exemplary embodiment, different values of the look-ahead window size parameter are used in the exemplary simulation engine to obtain a measure of a hit ratio for each parameter value over the training data. A substantially optimal value is determined for the look-ahead window using a binary search over the parameter space. The look-ahead window size that yields the substantially highest average cache hit ratio (or lowest cache miss ratio) over at least a portion of the training data is selected as the substantially optimal look-ahead window size. The determined look-ahead window value is employed by the cache prefetch manager 120 going forward, as more I/O data is processed.

Figure 3:
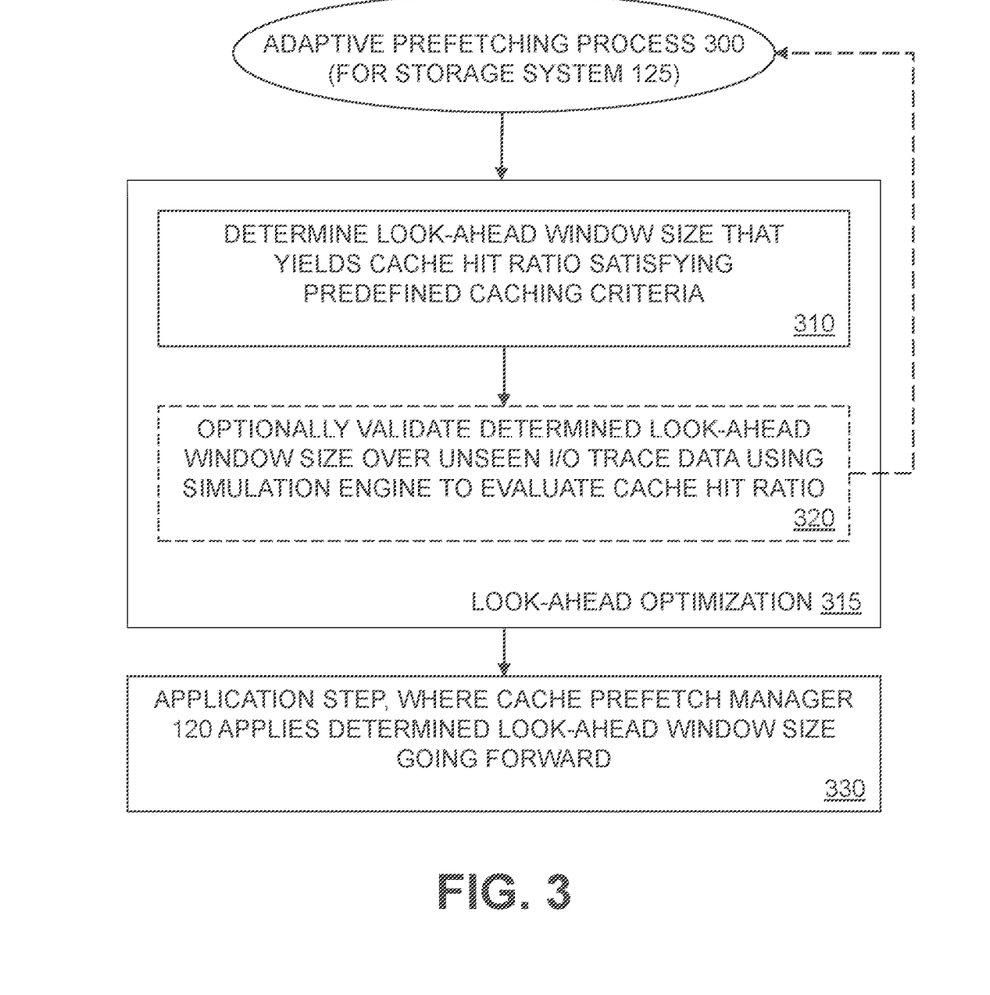
FIG. 3 illustrates an exemplary adaptive prefetching process that performs a look-ahead optimization for an entire storage system, according to some embodiments.

FIG. 3 illustrates an exemplary adaptive prefetching process 300 that performs a look-ahead optimization process 315 for an entire storage system, according to some embodiments. As shown in FIG. 3, the exemplary adaptive prefetching process 300 initially determines a look-ahead window size during step 310 that yields a cache hit ratio that satisfies one or more predefined caching criteria. In some embodiments, the predefined caching criteria comprises the determined look-ahead substantially maximizing the hit ratio obtained using the simulation engine over training data.

During step 320, the exemplary adaptive prefetching process 300 optionally validates the determined look-ahead window, determined in step 310, using the simulation engine over unprocessed I/O data for a given period of time. If the determined look-ahead window is not satisfactory, the process 300 starts again. Thereafter, the determined look-ahead window is employed by the cache prefetch manager 120 during step 330 going forward.

In practice, a storage system 125 could, for example, be deployed with a standard prefetching policy. As the storage system 125 starts to operate, the cache prefetch manager 120 collects I/O traces (or statistics thereof) that reflect how the address space of the storage system 125 is being traversed. With that data, the cache prefetch manager 120 can run the optimizations in order to find the best look-ahead window to improve cache hits. When the optimized policy outperforms the standard policy, the system can switch to the optimized policy and operate with the optimized policy going forward.

Fixed, Optimized Look-Ahead for Each LUN of Storage System

In at least one embodiment, the exemplary automatic, adaptive prefetching techniques employ a second caching policy that substantially optimizes the look-ahead window for each LUN 130 of the storage system 125, rather than for the entire storage system 125. Generally, for the exemplary second caching policy, the exemplary cache prefetch manager 120 collects information about the data access patterns on each LUN 130 of the storage system 125 for a certain period of time. The cache prefetch manager 120 then substantially optimizes the look-ahead window for each LUN 130 of the storage system 125, and employs the optimized look-ahead window values for each LUN 130, going forward.

Figure 4:
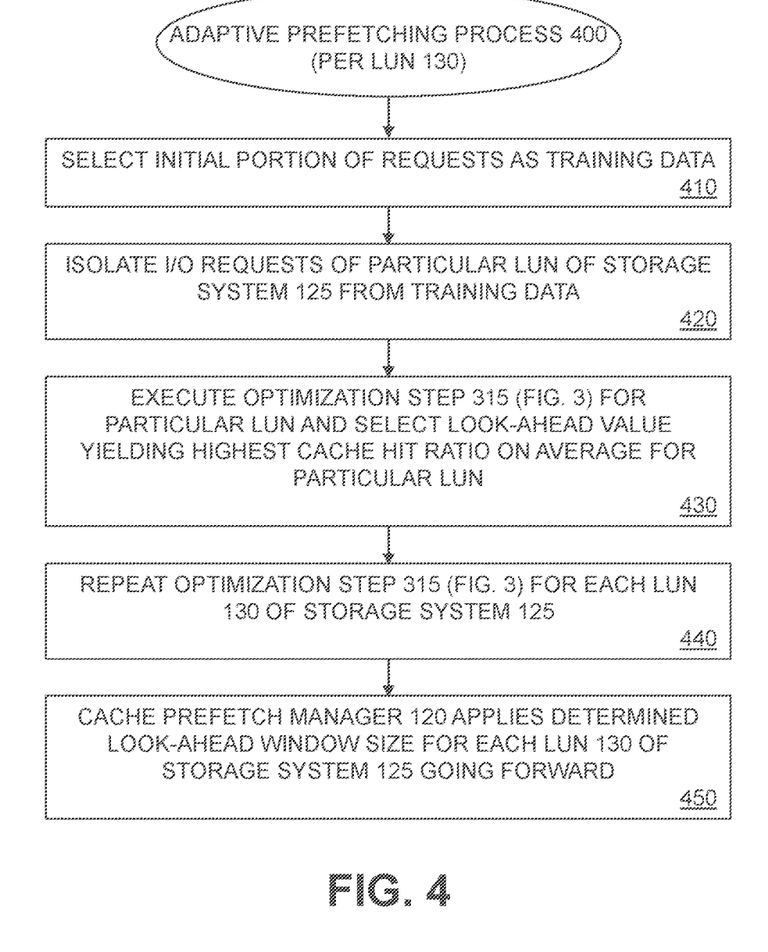
FIG. 4 illustrates an exemplary adaptive prefetching process that performs a look-ahead optimization for each logical unit (LUN) of a storage system, according to at least one embodiment of the disclosure.

FIG. 4 illustrates an exemplary adaptive prefetching process 400 that performs a look-ahead optimization for each LUN 130 of a storage system 125, according to at least one embodiment. As shown in FIG. 4, the exemplary adaptive prefetching process 400 initially selects a portion of the requests as training data during step 410.

Thereafter, during step 420, the exemplary adaptive prefetching process 400 isolates the I/O requests associated with a particular LUN of the storage system 125 from the training data. During step 430, the exemplary adaptive prefetching process 400 executes the exemplary look-ahead optimization process 315 of FIG. 3, but only for one LUN, and selects the look-ahead value that yields the substantially highest cache hit ratio on average for the one LUN under consideration. As shown in FIG. 4, the exemplary look-ahead optimization process 315 of FIG. 3 is repeated during step 440 for each LUN of the system, leading to the substantially best look-ahead value for each LUN. The determined look-ahead values are then employed by the cache prefetch manager 120 in step 450 without isolating the LUNs. The target LUN of a request is identified and the look-ahead associated with that LUN is applied upon a cache miss.

Figure 5:
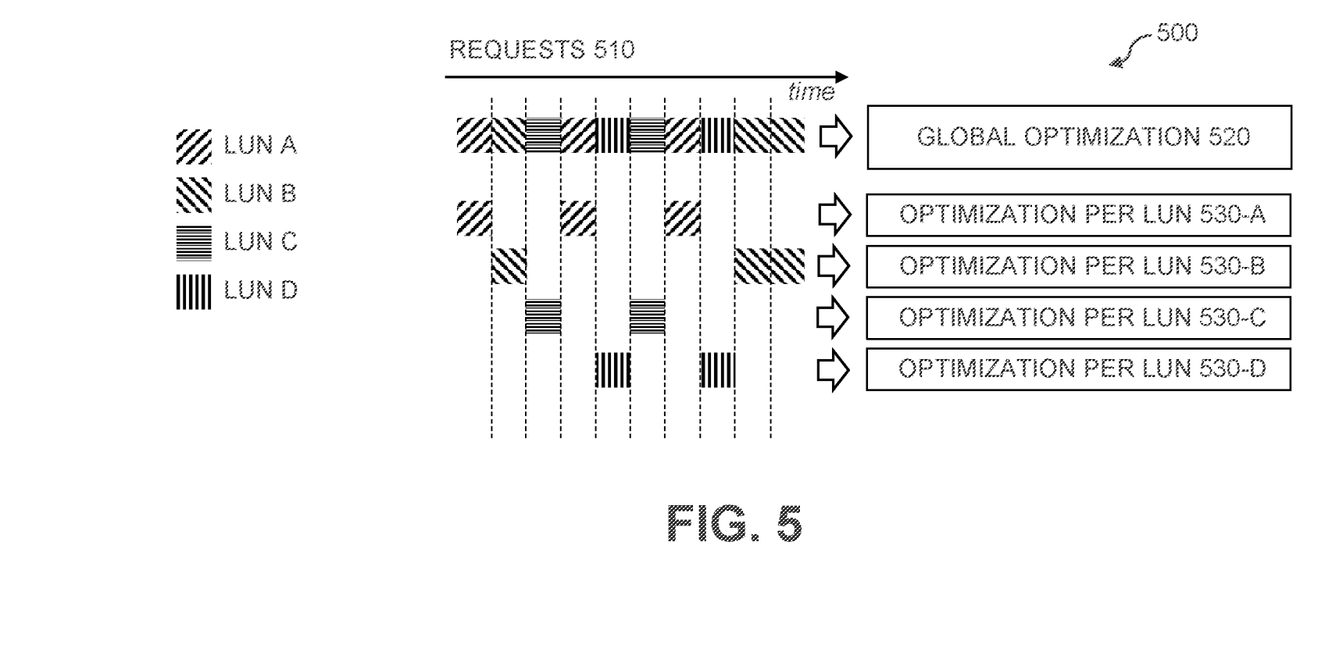
FIG. 5 illustrates a selection of a look-ahead window value for each LUN of a storage system, according to at least one embodiment.

FIG. 5 illustrates a selection 500 of a look-ahead window value for each LUN 130 (e.g., LUNs A through D) of the storage system 125, according to at least one embodiment, using steps 410 through 440 of the adaptive prefetching process 400 of FIG. 4. As shown in FIG. 5, the I/O requests 510 are processed by the cache prefetch manager 120 to determine a look-ahead window size. The cache prefetch manager 120 can optionally perform a global optimization 520 to determine a look-ahead window size for the entire storage system 125, using step 310 of the adaptive prefetching process 300 of FIG. 3. Alternatively, the cache prefetch manager 120 can perform an optimization for each LUN 530-A through 530-D to determine a look-ahead window size for each respective LUN 530.

A possible practical implementation of the optimized look-ahead per LUN could be similar to the one described for the adaptive prefetching process 300 for the entire storage system 125. Namely, the storage system 125 could be deployed with a standard policy per LUN. As the system operates, the optimizations take place. The cache prefetch manager 120 then decides when to switch to the optimized policies for each LUN.

Figure 6:
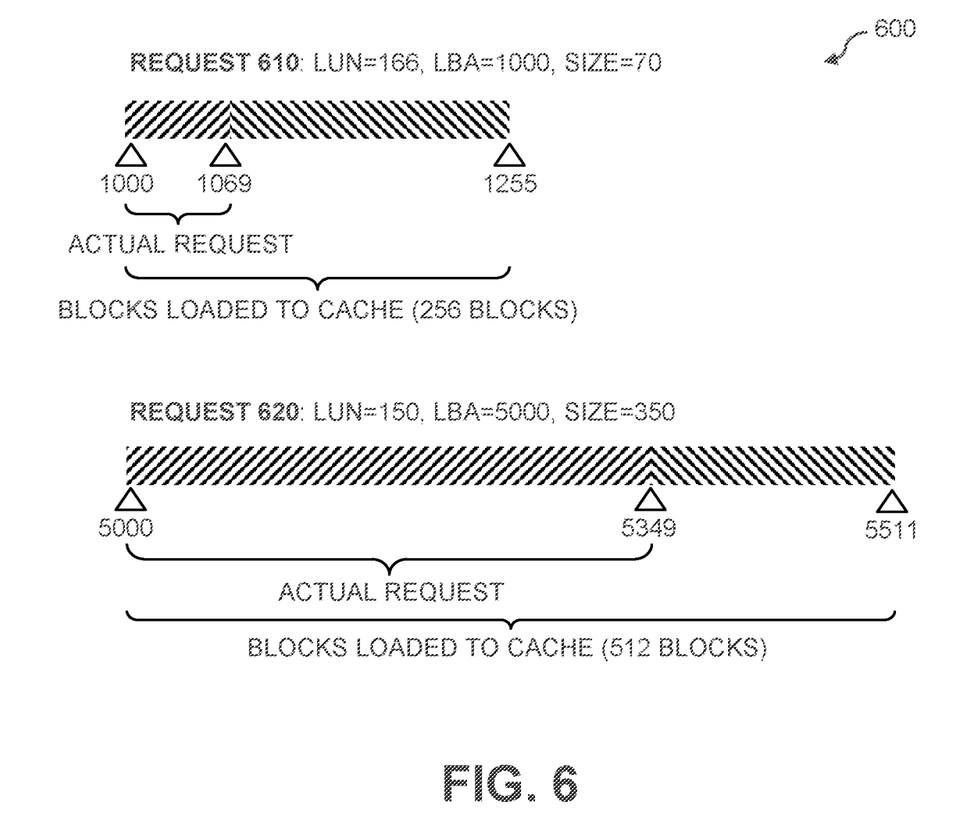
FIG. 6 illustrates a variable look-ahead window value for each LUN of the storage system, according to some embodiments.

FIG. 6 illustrates a variable look-ahead window value 600 for each LUN 130 of the storage system 125, according to some embodiments. As shown in FIG. 6, a first request 610 is for LUN 166, and targets 70 blocks starting at the logical block address 1000. Using a variable look-ahead window value of 256 blocks for the request 610, the cache prefetch manager 120 will obtain the requested 70 blocks, as well as an additional 186 blocks to fill the look-ahead window, and will move the collected 256 blocks to the cache memory 150, except for those blocks already in the cache.

In addition, a second request 620 identifies LUN 150, and targets 350 blocks starting at the logical block address 5000. Using a variable look-ahead window value of 512 blocks for the request 620, the cache prefetch manager 120 will obtain the requested 350 blocks, as well as an additional 162 blocks to fill the look-ahead window, and will move the collected 512 blocks to the cache memory 150, except for those blocks already in the cache.

Variable, Optimized Look-Ahead Across Time

In at least one embodiment, the exemplary automatic, adaptive prefetching techniques employ a third caching policy that employs an adaptive strategy that updates the look-ahead values over time. Generally, for the exemplary third caching policy, the cache prefetch manager 120 re-executes at least portions of the adaptive prefetching processes of FIG. 3 or FIG. 4 at regular (or irregular) intervals. Namely, the cache prefetch manager 120 collects information about the data access pattern for a certain period and uses that information to substantially optimize the look-ahead (either for the entire storage system 125 or for each of LUN 130) for the next period of time. The cache prefetch manager 120 keeps collecting information about the data access patterns and uses the collected information to re-optimize the look-ahead window for the following period, and so on.

In some embodiments, a time window of five minutes, for example, is defined. In the first window, the exemplary adaptive prefetching process of FIG. 3 or FIG. 4 is performed. Namely, a small training data set is selected to find the substantially optimal look-ahead window size during look-ahead optimization process 315 and the substantially optimal look-ahead window size is employed during step 330 in the remaining section of the first time window. For the second window, the requests of the first time window are used as the training data for the second window, and the look-ahead window is substantially optimized using the training data for the second window, and the new substantially optimal look-ahead window size is applied for the second time window.

In the third window, the requests of the second time window are used as the training data for the third window, and so on. In this manner, variations in the access patterns are captured across time, substantially optimizing the cache behavior according to the specificities of each data access workload. Such optimization can be done for the entire system (using the adaptive prefetching process 300 of FIG. 3) or for each LUN of the system (using the adaptive prefetching process 400 of FIG. 4).

Figure 7:
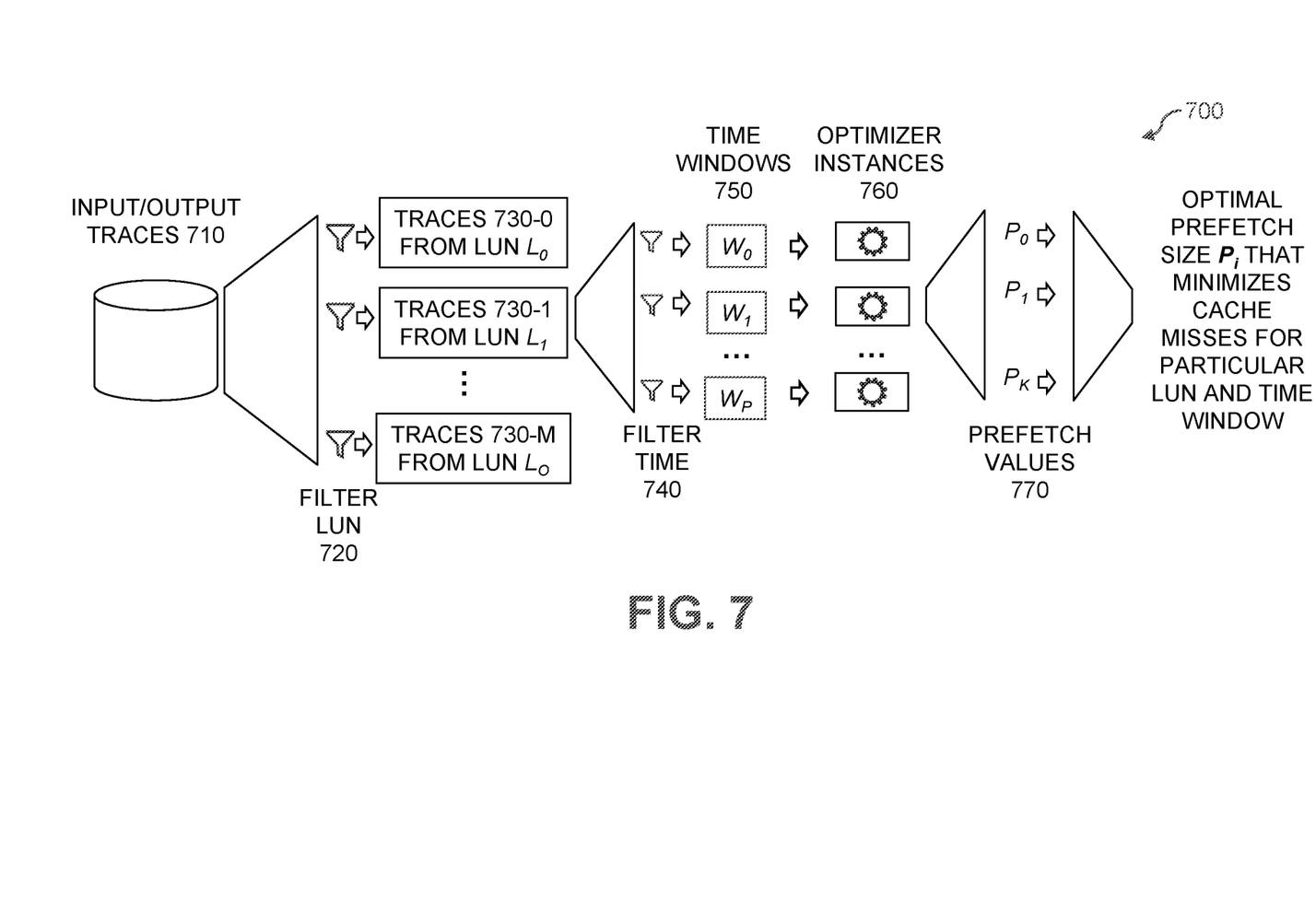
FIG. 7 illustrates an exemplary optimization process that performs a look-ahead window optimization per time window, and per LUN, according to one or more embodiments.

FIG. 7 illustrates an exemplary optimization process 700 that performs a look-ahead window optimization per time window, and per LUN 130, according to one or more embodiments. As shown in FIG. 7, I/O traces 710 from a particular storage system 125 are obtained and then filtered by LUN 130 at stage 720, to obtain traces 730-0 through 730-M from each LUN $L_0$ through $L_O$, respectively, where the number of LUNs is less than or equal to the number of requests. The LUN specific traces 730 are then filtered by time at stage 740 to obtain P time windows 750 ($w_0$ through $w_P$) (per time window, and per LUN 130). An optimizer instance 760 is applied to each LUN 130 per time window, to determine k prefetch values 770 (look-ahead window size), with one value per LUN 130. As described previously, in one exemplary embodiment, the substantially optimal values obtained for time window $w_i$ can the applied in time window $w_{i+1}$.

The third caching policy is adaptive by nature and can be implemented in the manner described above. Namely, after defining a time window for periodic cache policy updates, the cache prefetch manager 120 updates the look-ahead parameters of the storage system 125 (or of each LUN 130) and continues to operate in the manner described above. Note that the definition of the time window could itself be automatic, based on the identification of patterns related to different states of operation related to how the applications access the storage, as would be apparent to a person of ordinary skill in the art.

One or more embodiments of the disclosure provide mechanisms to optimize the look-ahead window in cache prefetching policies for improving performance of a cache memory 150 in a storage system 125. Those mechanisms vary in terms of the spatial and the temporal granularity with which they are applied, and overcome limitations in "one-size-fits-all" approaches deployed even with existing storage systems.

The mechanisms proposed herein can be extended to other types of systems and protocols. For instance, they can be used in CPU caches (L1, L2, etc.), network switches, and storage tiering.

In some embodiments, the disclosed adaptive look-ahead techniques for data prefetching improve a performance (e.g., a cache hit ratio) for a cache memory 150.

Among other benefits, the disclosed adaptive look-ahead techniques consider a plurality of available caching policies based on characteristics of input/output workloads. As noted above, the disclosed exemplary cache prefetch manager 120 of FIG. 1 addresses the cache optimization problem by automatically and adaptively choosing different look-ahead windows for each storage system, for each LUN of a storage system, and/or for various time windows, to improve cache performance and application performance in general.

One or more embodiments of the disclosure provide improved methods, apparatus and computer program products for adaptive look-ahead for data prefetching. The foregoing applications and associated embodiments should be considered as illustrative only, and numerous other embodiments can be configured using the techniques disclosed herein, in a wide variety of different applications.

It should also be understood that the disclosed adaptive look-ahead techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adaptive look-ahead for data prefetching may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based cache prefetch manager 120, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based cache prefetch manager platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
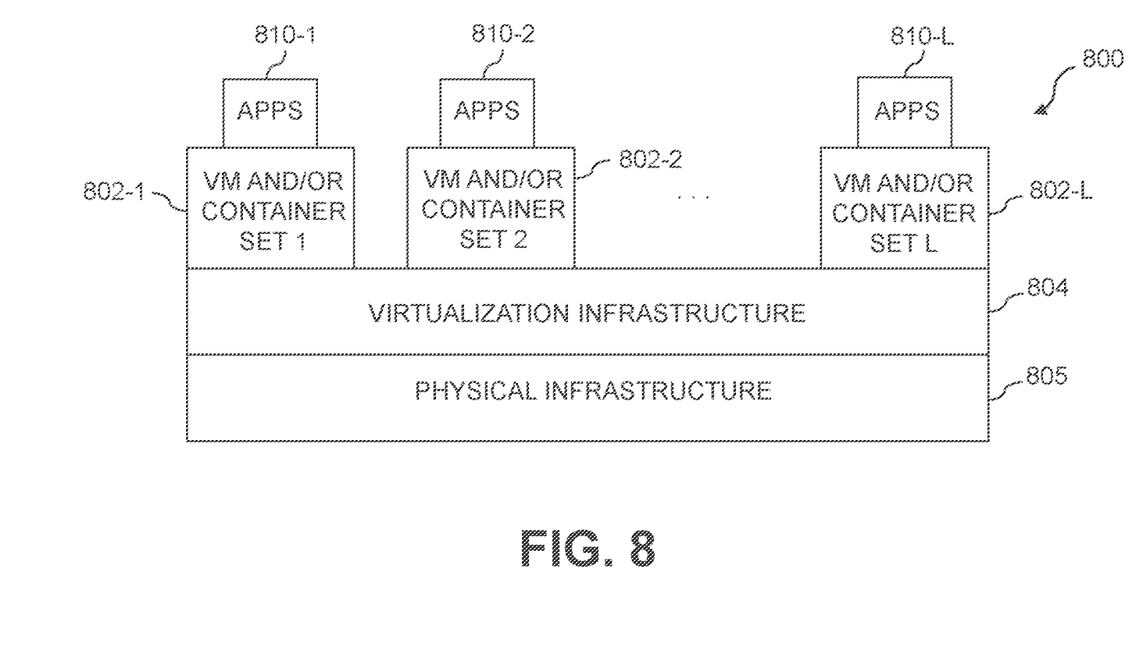
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the cache prefetch manager 120. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide adaptive look-ahead functionality of the type described above for one or more processes running on a given one of the VMs. For example, each of the VMs can implement adaptive look-ahead control logic for providing adaptive look-ahead window selection functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide adaptive look-ahead functionality of the type described above for one or more processes running on different ones of the containers. For example, a container host device supporting multiple containers of one or more container sets can implement one or more instances of adaptive look-ahead control logic for use in selecting look-ahead window values.

As is apparent from the above, one or more of the processing modules or other components of the storage environment 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
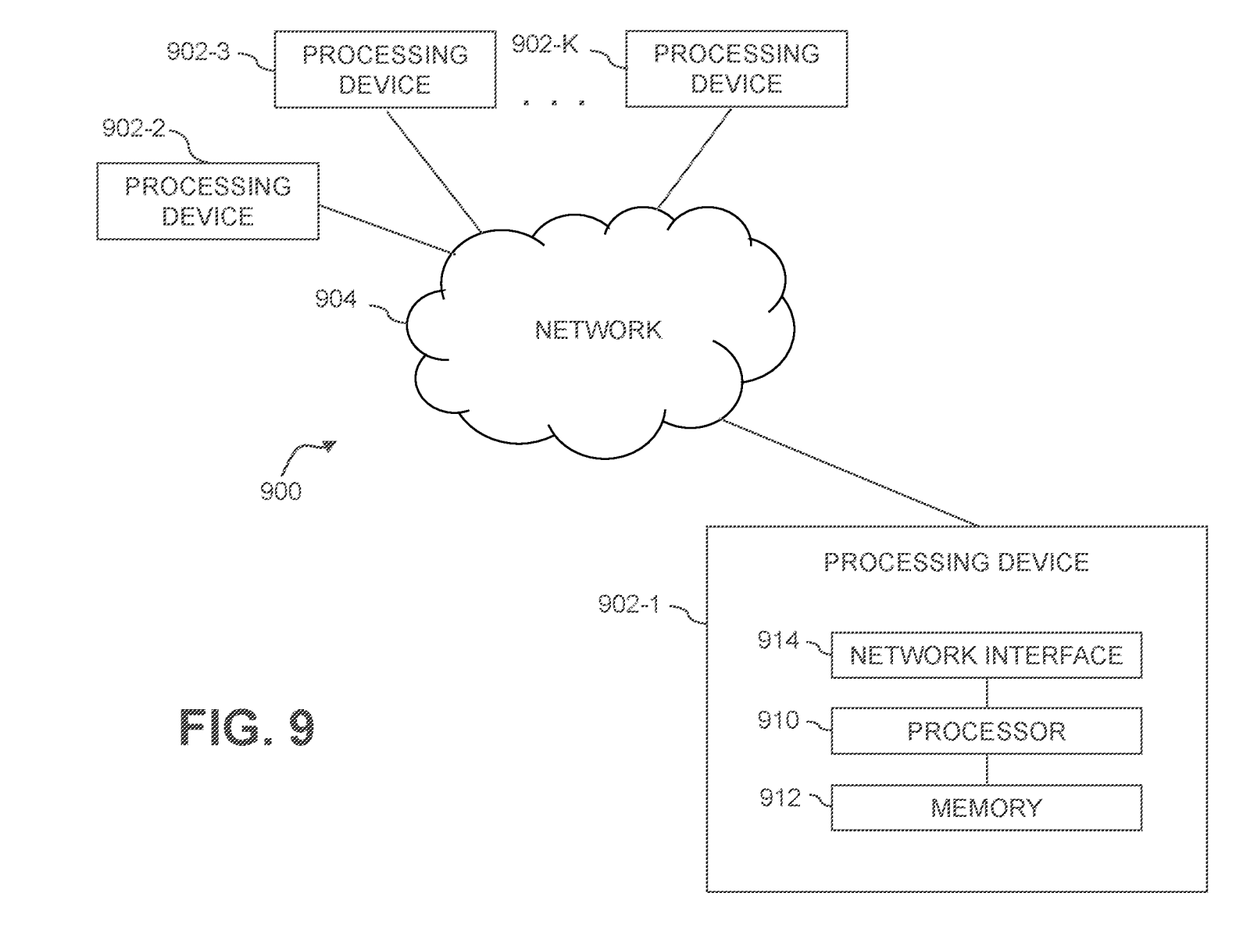
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
establishing a plurality of look-ahead window sizes for respective ones of a plurality of logical units of a storage system, the storage system comprising a plurality of physical storage devices and a cache memory separate from the plurality of physical storage devices, wherein the look-ahead window size for a given one of the logical units specifies a number of data items to be copied from the given logical unit to the cache memory;
implementing a simulation engine that simulates performance of the cache memory for different values of the look-ahead window size for each of at least a subset of the logical units, utilizing different sets of training data for respective different ones of the logical units, wherein the set of training data for the given logical unit is obtained by isolating, from a larger set of training data, a plurality of input/output requests associated with the given logical unit previously processed by the storage system;
responsive to a detected event in the storage system, updating the look-ahead window size for at least the given logical unit based at least in part on one or more outputs of the simulation engine; and
controlling copying of data items from the given logical unit to the cache memory based at least in part on the updated look-ahead window size;
wherein the method is performed by at least one processing device comprising a processor coupled to a memory.

2. The method of claim 1, wherein the look-ahead window for the given logical unit is updated using the plurality of input/output requests associated with the given logical unit within at least one prior time window, and wherein the updated look-ahead window is used for at least one subsequent time window.

3. The method of claim 1, further comprising the step of varying the size of the look-ahead window for each logical unit over time.

4. The method of claim 1, wherein the updating comprises determining the size of the look-ahead window for the given logical unit based on one or more caching criteria and employing the updated look-ahead window size for the given logical unit if the caching criteria is satisfied, wherein the caching criteria is evaluated using the simulation engine that processes the training data associated with the given logical unit.

5. The method of claim 4, further comprising the step of validating the updated look-ahead window size for the given logical unit on previously unprocessed data associated with the given logical unit, using the simulation engine, prior to employing the updated look-ahead window size for the given logical unit.

6. The method of claim 4, wherein the caching criteria comprises determining whether the updated look-ahead window substantially maximizes the hit ratio obtained using the simulation engine over the training data.

7. The method of claim 1, wherein the detected event comprises one or more of a time-based event and receipt of at least one request for at least one data item.

8. The method of claim 1, wherein the simulated performance of the cache memory for different values of the look-ahead window size comprises one or more of a cache hit ratio and a cache miss ratio.

9. A system, comprising:
a memory; and
at least one processing device, coupled to the memory, operative to implement the following steps:
establishing a plurality of look-ahead window sizes for respective ones of a plurality of logical units of a storage system, the storage system comprising a plurality of physical storage devices and a cache memory separate from the plurality of physical storage devices, wherein the look-ahead window size for a given one of the logical units specifies a number of data items to be copied from the given logical unit to the cache memory;

implementing a simulation engine that simulates performance of the cache memory for different values of the look-ahead window size for each of at least a subset of the logical units, utilizing different sets of training data for respective different ones of the logical units, wherein the set of training data for the given logical unit is obtained by isolating, from a larger set of training data, a plurality of input/output requests associated with the given logical unit previously processed by the storage system;

responsive to a detected event in the storage system, updating the look-ahead window size for at least the given logical unit based at least in part on one or more outputs of the simulation engine; and controlling copying of data items from the given logical unit to the cache memory based at least in part on the updated look-ahead window size;

wherein the method is performed by at least one processing device comprising a processor coupled to a memory.

10. The system of claim 9, wherein the look-ahead window for the given logical unit is updated using the plurality of input/output requests associated with the given logical unit within at least one prior time window, and wherein the updated look-ahead window is used for at least one subsequent time window.

11. The system of claim 9, further comprising the step of varying the size of the look-ahead window for each logical unit over time.

12. The system of claim 9, wherein the updating comprises determining the size of the look-ahead window for the given logical unit based on one or more caching criteria and employing the updated look-ahead window size for the given logical unit if the caching criteria is satisfied, wherein the caching criteria is evaluated using the simulation engine that processes the training data associated with the given logical unit.

13. The system of claim 12, wherein the caching criteria comprises determining whether the updated look-ahead window substantially maximizes the hit ratio obtained using the simulation engine over the training data.

14. The system of claim 9, wherein the detected event comprises one or more of a time-based event and receipt of at least one request for at least one data item.

15. The system of claim 9, wherein the simulated performance of the cache memory for different values of the look-ahead window size comprises one or more of a cache hit ratio and a cache miss ratio.

16. A computer program product, comprising a non-transitory machine-readable storage medium having encoded therein executable code of one or more software programs, wherein the one or more software programs when executed by at least one processing device perform the following steps:

establishing a plurality of look-ahead window sizes for respective ones of a plurality of logical units of a storage system, the storage system comprising a plurality of physical storage devices and a cache memory separate from the plurality of physical storage devices, wherein the look-ahead window size for a given one of the logical units specifies a number of data items to be copied from the given logical unit to the cache memory;

implementing a simulation engine that simulates performance of the cache memory for different values of the look-ahead window size for each of at least a subset of the logical units, utilizing different sets of training data for respective different ones of the logical units, wherein the set of training data for the given logical unit is obtained by isolating, from a larger set of training data, a plurality of input/output requests associated with the given logical unit previously processed by the storage system;

responsive to a detected event in the storage system, updating the look-ahead window size for at least the given logical unit based at least in part on one or more outputs of the simulation engine; and controlling copying of data items from the given logical unit to the cache memory based at least in part on the updated look-ahead window size;

wherein the method is performed by at least one processing device comprising a processor coupled to a memory.

17. The computer program product of claim 16, wherein the look-ahead window for the given logical unit is updated using the plurality of input/output requests associated with the given logical unit within at least one prior time window, and wherein the updated look-ahead window is used for at least one subsequent time window.

18. The computer program product of claim 16, wherein the updating comprises determining the size of the look-ahead window for the given logical unit based on one or more caching criteria and employing the updated look-ahead window size for the given logical unit if the caching criteria is satisfied, wherein the caching criteria is evaluated using the simulation engine that processes the training data associated with the given logical unit.

19. The computer program product of claim 16, wherein the detected event comprises one or more of a time-based event and receipt of at least one request for at least one data item.

20. The computer program product of claim 16, wherein the simulated performance of the cache memory for different values of the look-ahead window size comprises one or more of a cache hit ratio and a cache miss ratio.

* * * * *